United States Patent [19]
Sadri

[11] Patent Number: 5,685,663
[45] Date of Patent: Nov. 11, 1997

[54] FASTENER CONSTRUCTION WITH INTERNAL SUPPORT FOR SPACED PORTIONS OF STRUCTURAL MEMBER

[75] Inventor: Shahriar M. Sadri, San Clemente, Calif.

[73] Assignee: Huck International, Inc., Tucson, Ariz.

[21] Appl. No.: 667,714

[22] Filed: Jun. 21, 1996

[51] Int. Cl.$^6$ .................. F16B 7/04; F16B 13/06
[52] U.S. Cl. .................. 403/284; 403/282; 403/281; 403/274; 403/2; 411/43; 411/361
[58] Field of Search .................. 403/2, 241, 282, 403/284, 281, 278, 279, 277, 274; 411/43, 69, 70, 361, 546

[56] References Cited

U.S. PATENT DOCUMENTS

| | | |
|---|---|---|
| 1,835,243 | 12/1931 | Schaffert .................. 411/546 X |
| 2,531,048 | 11/1950 | Huck . |
| 2,545,752 | 3/1951 | Singleton .................. 411/43 |
| 2,562,336 | 7/1951 | Selden . |
| 3,042,156 | 7/1962 | Rohe .................. 411/546 X |
| 3,063,148 | 11/1962 | Brilmyer . |
| 3,078,002 | 2/1963 | Rodgers .................. 411/43 X |
| 3,105,291 | 10/1963 | Koeller . |
| 3,116,848 | 1/1964 | Van Hecke . |
| 3,162,938 | 12/1964 | Koeller . |
| 3,295,876 | 1/1967 | Molin et al. . |
| 3,313,079 | 4/1967 | Phelan . |
| 3,355,850 | 12/1967 | Rohe . |
| 3,792,645 | 2/1974 | Chirco et al. . |
| 3,915,053 | 10/1975 | Ruhl . |
| 4,074,608 | 2/1978 | Siebol .................. 411/43 |
| 4,118,969 | 10/1978 | Corbett . |
| 4,170,920 | 10/1979 | Siebol .................. 411/43 |
| 4,347,728 | 9/1982 | Smith . |
| 4,472,096 | 9/1984 | Ruhl et al. . |
| 4,580,435 | 4/1986 | Port et al. . |
| 4,598,572 | 7/1986 | Mondello et al. .................. 72/391 |
| 4,760,495 | 7/1988 | Till . |
| 4,846,611 | 7/1989 | Sadri . |
| 4,941,769 | 7/1990 | Natsume . |
| 4,984,947 | 1/1991 | Flauraud . |

Primary Examiner—Anthony Knight
Attorney, Agent, or Firm—Harness, Dickey & Pierce, P.L.C.

[57] ABSTRACT

A fastening system for securing structural members such as C-channels for buildings, bridges and the like and including a fastener construction for securing the structural members through spaced flanges or plates at locations where there is limited support between such flanges or plates with the fastener as installed having a member providing substantially direct, columnar support between the spaced flanges or plates.

27 Claims, 5 Drawing Sheets

FASTENER CONSTRUCTION WITH INTERNAL SUPPORT FOR SPACED PORTIONS OF STRUCTURAL MEMBER

SUMMARY BACKGROUND OF THE INVENTION

The present invention relates to a fastening system including a fastener for securing together structural members such as C-channels, having spaced flanges or plates, by the application of a clamp force at locations on the flanges or plates which are generally not fully supported.

The present invention generally relates to multi-piece fasteners including swage type fasteners or lockbolts of the type illustrated in U.S. Pat. No. 2,531,048 to L. Huck, issued Nov. 21, 1950, U.S. Pat. No. 3,915,053 to J. Ruhl, issued Oct. 28, 1975 and to U.S. Pat. No. 5,090,852 to R. Dixon issued on Feb. 25, 1992. All of the above can be considered as prior art relative to the present invention.

In some heavy industrial applications, such as in the construction of buildings and bridges, structural frames and support members, including beams, are formed by joining together members such as C-channels. A C-channel can be considered to include a pair of spaced flanges integrally formed with and extending transversely and parallely from a center connecting plate. Frequently, two such C-channel members are connected together by welding gusset plates to adjoining spaced flanges at the proximate ends or sections of the channel members. This can be done to form a corner, an intermediate joint or simply to extend the overall length of the structural beam. It would be desirable in many instances to utilize multi-piece fasteners for such connections. In such applications, however, general accessibility to the area of the structural joint between the spaced flanges may be limited precluding the use of installation tools or requiring a rather complex installation procedure. In addition, the connections are often made in areas in which there is limited support between the spaced flanges. This would normally inhibit the use of a fastener assembly extending through and between the spaced flanges of the C-channels where the installation of the fastener would entail the application of an axial force in a location between the spaced flanges which would urge the flanges towards each other. At the same time, the final clamp load would, by necessity, be limited whereby the overall strength of the joint would also be limited. In addition, such a joint construction would be prone to unwanted slippage between the C-channels and connecting gusset plates. Alternatively, where possible, separate fasteners could be utilized for each of the spaced flanges and associated gusset plates with the likely increase in installation time and expense but still with no direct support between the spaced flanges.

In the present invention a unique fastener construction is provided whereby members, such as C-channels, can be secured together by use of gusset plates and a fastener having a support member adapted to be located between the spaced flanges and reformed during installation to provide structural support to the spaced flanges of the C-channel members whereby the gusset plates and spaced flanges can be secured together under a desired high clamp load. A high clamp load is desirable in order to inhibit slippage between the members at the connecting joint. Thus in one form of the present invention the fastener provides direct support between the spaced flanges by a member having a substantially columnar structure.

In some structural applications a main C-channel member is utilized which is partially closed by turned in spaced flanges at its longitudinally extending open side and is secured to a connecting member in the form of a C-channel which is fully open and not partially closed at the ends of the flanges.

With C-channel structures it may be desirable to simply provide support between the flanges at various intervals to resist forces of loads that might tend to deflect the flanges. The present invention provides a unique fastener type construction which can be used as a brace to provide such support in selected areas. This could facilitate the use of a C-channel member where otherwise box beams or C-channels with a more costly and/or complex brace structure would have to be used.

Thus it is an object of the present invention to provide a unique fastener construction for making a connection with a structural workpiece having spaced flanges or portions, such as in a C-channel member, by use of a relative axial force applied by the fastener to the spaced flanges of the C-channel member at locations where such spaced flanges or portions are generally unsupported.

It is another object of the present invention to provide a unique fastener construction for making a structural connection to spaced apart portions of structural members at locations which are generally unsupported.

It is still another object of the present invention to provide a multi-piece fastener for making a structural connection at spaced apart portions of structural members at locations which are generally unsupported with the fastener having a support member which is reformed during installation with a columnar structure for providing direct support between the spaced portions.

It is another object of the present invention to provide a multi-piece swage type fastener for making such a structural connection between spaced apart portions of structural members.

It is another object of the present invention to provide a two-piece fastener for making such a structural connection between spaced apart portions of structural members.

It is another object of the present invention to provide a two-piece fastener utilizing a spiral or helical spline type construction for making such a structural connection between spaced apart portions of structural members.

It is a general object to provide a unique multi-piece fastener for making a connecting joint to a structural member with the fastener having a construction for automatically providing direct, columnar support between spaced apart portions of the member which spaced portions are generally relatively unsupported at the location of the connecting joint.

It is another object to have a fastener like device for use as a brace for providing support between spaced apart flanges of a C-channel member.

Other objects, features and advantages of the present invention will become apparent from the subsequent description and the appended claims, taken in conjunction with the accompanying drawings, in which:

DESCRIPTION OF EMBODIMENTS OF THE INVENTION

Figure 1:
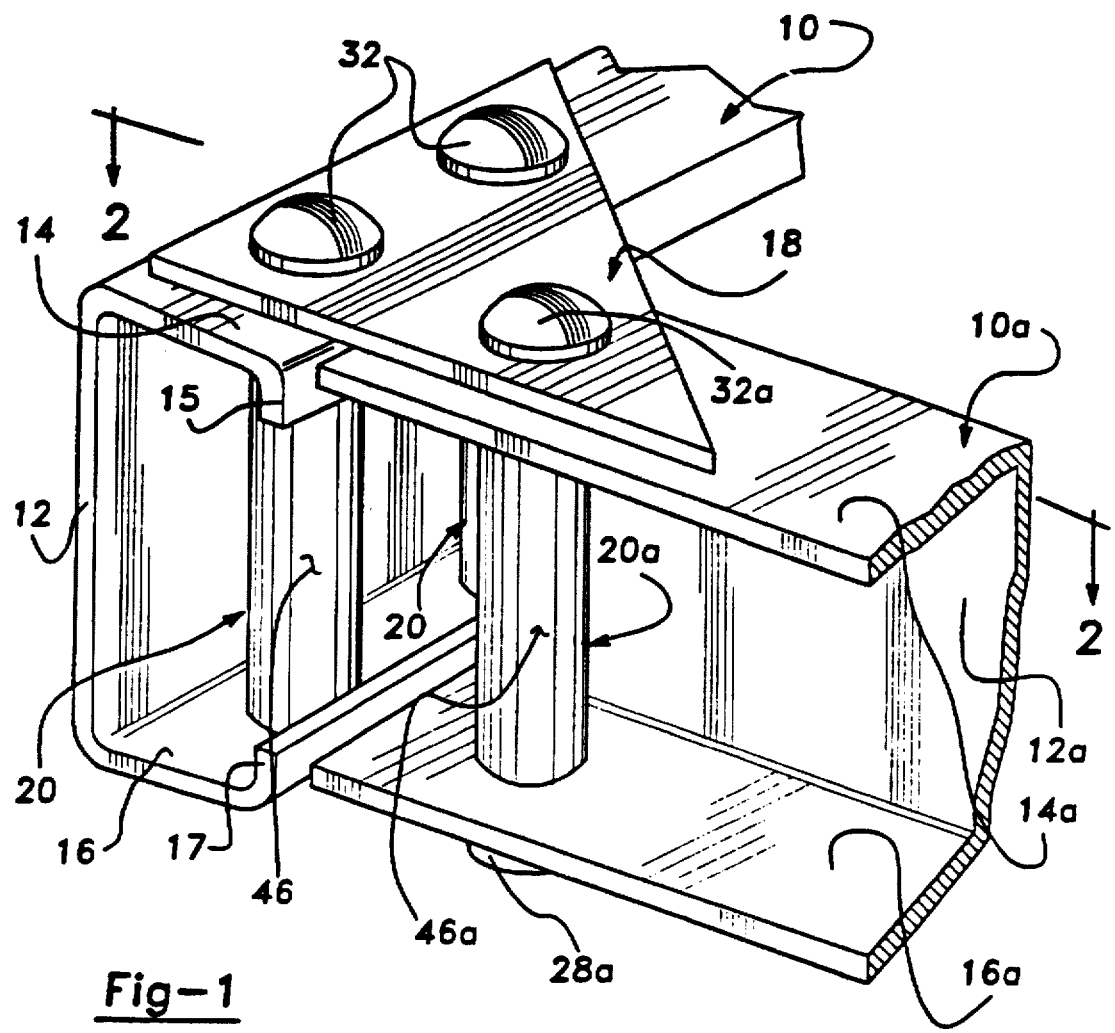
FIG. 1 is a perspective view of a structural corner assembly depicting a pair of C-channel members connected together through spaced flanges at locations providing generally limited support for loads between the flanges and utilizing fasteners of the present invention shown in a fully installed condition and with the fasteners being of the swage type.
Figure 2:
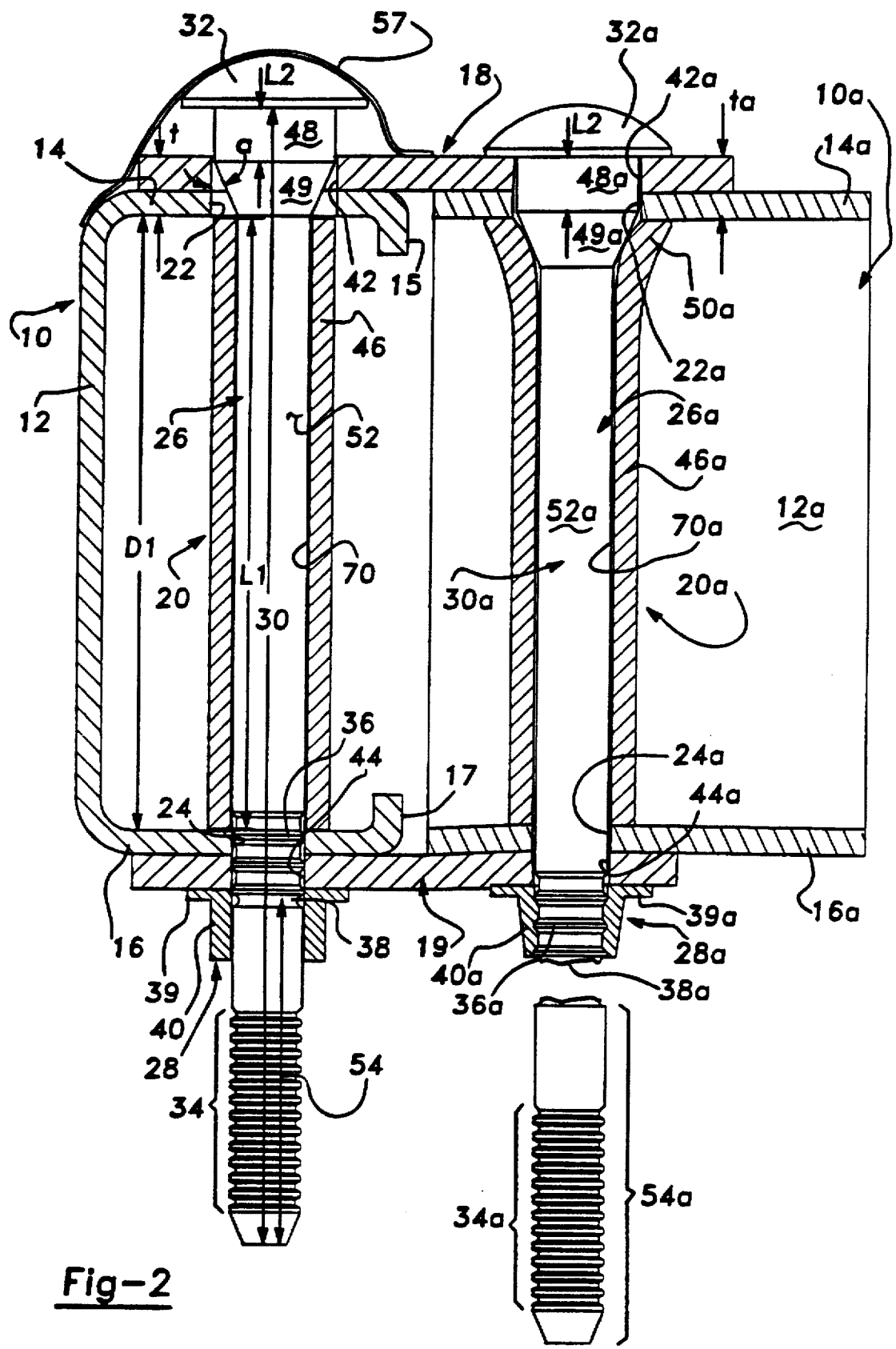
FIG. 2 is an elevational view with some parts shown in section of the joint of FIG. 1 generally taken in the direction of the Arrows 2—2 in FIG. 1 but prior to completion of the installation and depicting a pair of fasteners of the present invention with one of the fasteners shown before being finally installed and the other of the fasteners shown after final installation.

Looking now to FIGS. 1 and 2 of the drawings, a pair of structural C-channels 10 and 10a are shown in assembled relationship for forming a corner joint. The C-channels 10 and 10a include center plates 12 and 12a with each having a pair of spaced flanges 14, 16, and 14a, 16a which are integral with and extend parallely from opposite ends of the associated one of the center plates 12 and 12a. The C-channel 10 is a partially closed main structural channel member in which the outer free ends 15 and 17 of flanges 14 and 16, respectively, are partially turned arcuately inwardly towards each other. The C-channel 10a is an open channel, structural connector member in which the outer, free ends of the flanges 14a and 16a are planar, i.e. not turned in. In all other respects the C-channels 10 and 10a are substantially identical in cross-section. It should be understood that the present invention is equally applicable for connecting a C-channel member to a member which is of a substantially identical construction or to other structures of different configurations.

A pair of flat, gusset plates 18, 19 are utilized to connect the C-channels 10 and 10a together by way of fasteners 20, 20a. The fasteners 20 and 20a are identical except that in FIG. 2 the fastener 20 is shown in its pre-installed condition while fastener 20a is shown in its installed condition. As can be seen from FIG. 1, the gusset plate 18 is in the shape of a right triangle with the base located on the main channel flange 14. The gusset plate 19 is of a substantially identical triangular construction with its base similarly located on the main channel flange 16. In this way two fasteners 20 are installed at the base of the gusset plates 18, 19 on the flanges 14, 16 of the main C-channel member 10 and a third fastener 20a is installed near the apex of the triangular gusset plates 18, 19 on the flanges 14a, 16a of the C-channel connector member 10a.

Looking now to FIG. 2 the spaced flanges 14, 16 and 14a, 16a are provided with aligned openings or bores 22, 24 and 22a, 24a, respectively. The bores 22, 22a in flanges 14, 14a are of a larger diameter than the opposite, aligned bores 24, 24a in flanges 16, 16a for a purpose to be described.

The fasteners 20, 20a are of a swage type construction and include a pin 26, 26a and a collar 28, 28a. The pin 26, 26a includes an elongated shank 30, 30a terminating at one end in an enlarged pin head 32, 32a. The pin shank 30, 30a at the opposite end, is provided with a pintail portion 54, 54a including a plurality of annular pull grooves 34, 34a. A plurality of annular lock grooves 36, 36a are located proximate to the pintail portion 54, 54a and are separated therefrom by a reduced diameter, annular breakneck groove 38, 38a. The breakneck groove 38, 38a defines the weakest portion of the pin shank 30, 30a and is adapted to fracture at final installation after the collar 28, 28a has been swaged into the lock grooves 36, 36a. In this regard the collar 28, 28a is of a cylindrical construction with a generally circular cross-section and includes a flange 39, 39a with a tubular shank portion 40, 40a which is adapted to be swaged into the lock grooves 36, 36a.

The gusset plate 18 has a plurality of bores 42, 42a which are generally of the same diameter as and adapted to be placed in coaxial alignment with the large diameter flange bores 22, 22a. Similarly, the gusset plate 19 has a plurality of bores 44, 44a which are generally of the same diameter as and adapted to be placed in coaxial alignment with the smaller diameter flange bores 24, 24a.

An elongated cylindrical support sleeve 46, 46a, prior to installation, is of generally uniform inside and outside diameters and is adapted to be received on the pin shank 30, 30a with a slight clearance fit. At the same time in preparation for installation the generally uniform outside diameter permits the sleeve 46, 46a to be moved through the larger diameter gusset bores 42, 42a and associated flange bores 22, 22a with a slight clearance. As such the preinstalled inside diameter of sleeve 46, 46a is generally equal to the small diameter gusset bores 44, 44a and associated flange bores 24, 24a. Thus, as shown in FIG. 2, when the pin 26 and support sleeve 46 of the pre-installed fastener 20 are preassembled to the C-channels 10, 10a and the gusset plates 18, 19 in preparation for installation, the support sleeve 46 prior to installation will be in engagement with the inside surface of the spaced flange 16 holding these fastener members in place. It can be seen that the sleeve 46, 46a provides no axial engagement or interference with either of the gusset plates 18 or 19 thus facilitating the handling of these members in preparation for installation.

As a matter of convenience to the operator and in order to facilitate handling of the fastener 20 the leading end of the support sleeve 46 can be lightly crimped into one or more of the lock grooves 36 to hold the pin 26 and sleeve 46 together for assembly with the C-channels 10, 10a and gusset plates 18, 19 prior to the installation cycle. Alternatively the sleeve 46 can be provided with a slight interference fit with the lock grooves 36. In this way the preassembled combination of pin 26 and sleeve 46 can be handled as a single unit and readily assembled into the one gusset plate 18 and spaced flanges 14, 14a of C-channels 10, 10a.

The pin shank 30, 30a has an enlarged, generally uniform diameter smooth land portion 48, 48a connected to the pin head 32, 32a. The land portion 48, 48a has a diameter generally the same as the diameter of the gusset bores 42, 42a and the associated flange bores 22, 22a whereby it can be moved therethrough with a slight clearance fit. A tapered shank portion 49, 49a connects the land portion 48, 48a to an elongated, smooth shank portion 52, 52a of reduced diameter. The lock grooves 36, 36a can be formed by rolling the portion of the pin shank 30, 30a adjacent the breakneck groove 38, 38a. Since the support sleeve 46 has an internal diameter approximately that of the crests of lock grooves 36 and hence of the smooth shank portion 52, the sleeve 46 in its pre-installed condition will be held from further movement towards the pin head 32 by the tapered portion 49. In this regard, the crests of the pull grooves 34 are also approximately that of the internal diameter of the sleeve 46. The length L1 of the sleeve 46 is generally equal to the distance D1 between the inner surfaces of spaced channel flanges 14, 14a and 16, 16a.

The fastener 20, 20a can be installed by generally conventional tools constructed in a manner well known in the art for the installation of swage type fasteners and hence the details thereof have been omitted for purposes of simplicity. See for example the installation pull tool as partially shown in U.S. Pat. No. 4,472,096 to Ruhl et al issued on Sep. 18, 1984 for Optimized Fastener Construction System and Method. Such installation tool has a collet with a plurality of gripping jaws adapted to grip the pull grooves 34, 34a and a swage anvil adapted to engage the collar 28, 28a. As a relative axial pulling force is applied between the collet and the swage anvil a relative axial force is applied between the pin 26, 26a and collar 28, 28a. This force pulls the pin 26, 26a relative to the support sleeve 46, 46a which, as noted, is held from movement by its engagement with the inside surface of flanges 16, 16a. This is exemplified by fastener 20, 20a in FIG. 2. As the relative axial force increases the tapered portion 49a is drawn into the confronting end of the sleeve 46a causing it to be deformed radially outwardly to form an enlarged head portion 50a having a generally tulip like or flared configuration. The axial length L2 of the enlarged diameter land portion 48, 48a is at least generally equal to the combined thickness t, ta of the gusset plate 18 and spaced channel flanges 14, 14a. Thus, as can be seen for fastener 20a in FIG. 2, the enlarged diameter portion 48a will generally not be moved into the expanded end or head portion 50a of the support sleeve 46a. Alternatively, as will be seen in the embodiment of FIG. 3, the land portion, such as 48, 48a, can be slightly longer and move partially into the head portion 50a. As the relative axial force continues to increase, the gusset plate 18 and spaced channel flange 14a are urged together and against the enlarged sleeve head portion 50a while the gusset plate 19 and flange 16a are urged together against the opposite end of the support sleeve 46a. The relative axial load is now being resisted by the sleeve 46a such that the gusset plate 18 and spaced channel flange 14a are firmly clamped together with the opposite gusset plate 19 and spaced channel flange 16a. The enlarged head portion 50a can be formed into the noted tulip configuration with substantially no change in the overall length L1 of the support sleeve 46, 46a thus providing a reliable match to the distance D1 between the channel flanges 14, 16, and 14a, 16a.

As the relative axial force continues to increase a swage cavity in the swage anvil is moved axially to radially overengage the tubular shank portion 40a of collar 28a to swage it radially inwardly into the lock grooves 36a to firmly clamp the assembly together under a preselected preload (see FIG. 2). Upon a further increase in the relative axial force, the pin shank 30a is severed at the breakneck groove 38a removing the pintail portion 54a including the pull grooves 34a. The installation tool can now be further actuated to eject the swaged collar 28a along with the severed pintail portion 54a.

The fastener 20 can be installed in the same manner as described for fastener 20a resulting in a completed installation of the joint between C-channels 10, 10a as shown in FIG. 1.

It can be seen that after final installation of the fastener 20a the gusset plate 18 and spaced flange 14a on the one side and the gusset plate 19 and spaced flange 16a on the other side are tightly clamped together through the support sleeve 46a at a desired magnitude. In this regard the open end of the enlarged head portion 50a of the tulip configuration is in direct and full engagement with the inside surface of the channel flange 14a. At the same time the opposite end of the sleeve 46a is in direct and full engagement with the inside surface of the channel flange 16a. Thus the sleeve 46a substantially defines a columnar formation and as such is capable of accepting a high clamp load urging the flanges 14a, 16a together. At the same time the relative axial force applied between the pin 26, 26a and the collar 28, 28a to set the fastener 20, 20a will be utilized substantially directly to determine the final clamp load. Thus the clamp load can be selected with substantial accuracy to be of a relatively high magnitude such that slippage between the structural members is inhibited. The resultant columnar shape of the support sleeve 46a facilitates the direct application of the installation force and achievement of such final high clamp load. It should be noted that the gusset plates 18 and 19 are clamped to the respective flanges 14a and 16a by the direct clamp force between pin head 32a and sleeve head portion 50a and the opposite bearing end of sleeve 46a and collar flange 39a whereby slippage is resisted. Slippage is also inhibited by the reasonably close fit between those portions of the pin shank 30a within and in confrontation with the surfaces of the associated bores in the gusset plates 18, 19 and spaced channel flanges 14a, 16a. The same, of course, will be true of the fastener 20, gusset plate 18 with spaced flange 14 and gusset plate 19 with spaced flange 16 after its installation. In addition, the surfaces of the gusset plates 18, 19, can be roughened to provide frictional engagement with the outer surfaces of the channel flanges 14, 14a and 16, 16a and also with the engaged surfaces of the pin head 32, 32a and flanges 39, 39a of the collars 28, 28a.

In order to facilitate the location of the gusset plate 19, collar 28 and installation tool onto the pin 26 in preparation for installation, the preassembled pin 26 and sleeve 46 can be temporarily held in place from axial movement by a small length of removable, adhesive retention tape 57 over the pin head 32. In addition an installation tool with a resiliently, generally open gripping jaw structure could be used, whereby the pull grooves 34 of the pin 26 can be inserted into the gripping jaws with a minimal resistance. Examples of such resilient, generally open jaw structures can be seen from U.S. Pat. No. 4,347,728 issued Sep. 7, 1982 to Smith and U.S. Pat. No. 4,598,572 issued Jul. 8, 1986 to Mondello, et al. In this way a single operator can install the fastener 20 by first locating the preassembled pin 26 and sleeve 46 into the workpieces at one end and then applying the other components and setting the fastener 20 by a final installation from the other end.

The components of the fastener and workpieces can be made of different materials. In one form of the invention the pins 26, 26a can be of a material such as a 1035 carbon steel; the support sleeves 46, 46a and collars 28, 28a can be of a material such as a 1010 low carbon steel with the sleeves 46, 46a drawn and annealed; the C-channels 10, 10a and gusset plates 18, 19 can be formed of a material such as a 1038 carbon steel.

In this regard, in a typical structural joint the spaced flanges 14, 16 and 14a, 16a would be spaced a distance L1 of around 8.5 inches with the thickness of the flange material being around ⅛ of an inch. The gusset plates 18, 19 would be around ½ inch thick. The support sleeve 46, 46a could typically have an outside diameter of around 1¾ inches and an inside diameter of around 1 inch thus providing a wall thickness of around ⅜ inch. At the same time the smooth shank portion 52, 52a, lock grooves 36, 36a and pintail portion 54, 54a will be of maximum diameter around 1 inch while the land portion 48, 48a can have a diameter of around 1¾ inches. The tapered shank portion 49 can be connected from land portion 48, 48a to smooth shank portion 52, 52a by an angle "a" of around 40°.

It should be noted that the support sleeve 46 is of a uniform construction throughout its length and hence can be assembled onto the pin 26 from either end thus facilitating assembly and handling.

Figure 3:
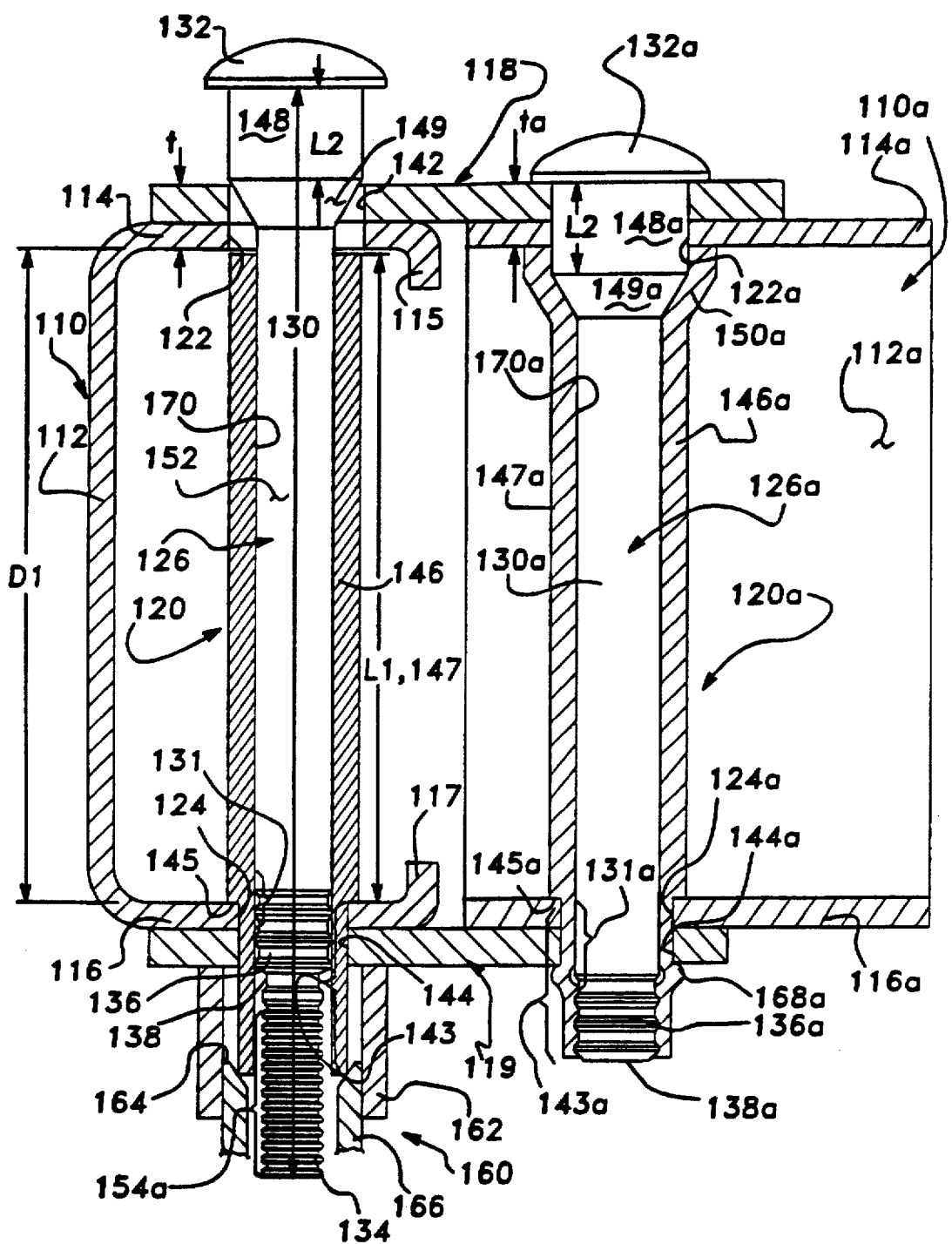
FIG. 3 is an elevational and partial sectional view similar to FIG. 2 depicting the use of a two-piece form of swage type fastener for connecting a pair of C-channel members.

A modified two-piece form of fastener is shown in FIG. 3. In the description of the embodiment of FIG. 3 components are numbered beginning with 100 and components similar to like components in the embodiment of FIGS. 1 and 2 are given the same or similar numeral designations with the addition of one hundred. Unless described otherwise below the components of the embodiment of FIG. 3 can be considered to substantially conform to the description previously given for the similarly numbered components in the embodiment of FIGS. 1 and 2 and, for purposes of brevity, such description may not be repeated.

In the embodiment of FIG. 3 the gusset plates 118, 119 are utilized to connect the C-channels 110 and 110a together by way of preassembled, two-piece fasteners 120, 120a. The fasteners 120 and 120a are identical except that fastener 120 is shown in its pre-installed condition while fastener 120a is shown in its installed condition.

The two-piece construction of FIG. 3 eliminates the need for a separate collar, such as the collar 28 of the embodiment of FIGS. 1 and 2, and as such further simplifies and facilitates the handling of fastener 120, 120a as a single, preassembled unit. Here the support sleeve 146, 146a is provided with a reduced diameter extension portion 143, 143a. A shoulder 145, 145a is defined by the juncture between the reduced diameter portion 143, 143a and the main sleeve portion 147, 147a. The reduced diameter portion 143, 143a is of a diameter generally equal to the diameter of the flange bores 124, 124a and gusset bores 144, 144a such as to be received therein with a slight clearance fit. Thus, when the pin 126, 126a and support sleeve 146, 146a of the fastener 120, 120a are preassembled to the C-channels 110, 110a and the gusset plates 118, 119 in preparation for installation, the reduced diameter portion 143, 143a will extend through the flange bore 124, 124a and associated gusset bore 144, 144a in a clearance relationship. As such the shoulder 145, 145a will then be in engagement with the inside surface of the spaced flange 116, 116a prior to installation. It can be seen that the sleeve 146, 146a provides no axial engagement or interference with either of the gusset plates 118 or 119 thus facilitating the handling of these members in preparation for installation.

The fasteners 120, 120a are of a swage type construction and, in this regard, are somewhat similar to fasteners 20, 20a of FIGS. 1 and 2 except that the support sleeves 146, 146a are of a different construction and function somewhat differently than support sleeves 46, 46a in a manner to be described. In addition the crest diameter of the pull grooves 134, 134a is slightly less than that of the lock grooves 136, 136a and the smooth shank portion 152, 152a.

In order to additionally facilitate handling of the preinstalled fastener 120, the leading end of the support sleeve 146 can be lightly crimped into one or more of the lock grooves 136 to hold the pin 126 and sleeve 146 together or alternatively the sleeve 146 can be provided with a slight interference fit with the lock grooves 136. In this way the pre-assembled combination of the pin 126 and sleeve 146 can be readily assembled into the one gusset plate 118 and spaced flanges 114, 114a, and 116, 116a of C-channels 110, 110a.

In this embodiment the length L1 of the main portion 147 of sleeve 146, in its preinstalled condition, is generally equal to the distance D1 between the inner surfaces of spaced flanges 114, 114a and 116, 116a. The fasteners 120, 120a can be installed by an installation tool 160, only partially shown, utilizing the principals of double action tools but generally modified to function in the manner as described. Examples of double action tools are shown in U.S. Pat. No. 3,116,848, issued Jan. 7, 1964 to Van Hecke, for Nose Assembly, U.S. Pat. No. 3,792,645, issued Feb. 19, 1974 to Chirco et al, for Double Action Tool Construction and U.S. Pat. No. 4,118,969, issued Oct. 10, 1978 to Corbett for Double Action Fastener Installation Tool For Blind Rivets And The Like. The construction of the tool 160 does not constitute a part of the present invention and hence details thereof have been omitted for purposes of simplicity.

Looking now to FIG. 3, the installation tool 160 is utilized having a stand-off outer anvil 162 which is constructed to normally extend beyond the outer end 164 of a movable inner, swage anvil 166. When the installation tool 160 is applied to the fastener 120, the pull grooves 134 of the pin 126 will be gripped by the jaws (not shown) of the tool 160 with the stand-off, outer anvil 162 in engagement with the gusset plate 119. When actuated the installation tool 160 will apply a relative axial force between the head 132, 132a of the pin 126, 126a and the shoulder 145, 145a of sleeve 146, 146a. As the relative axial installation force increases the tapered portion 149a of the pin 126a is drawn into the confronting end of the sleeve 146a causing it to be deformed radially outwardly to form an enlarged head portion 150a having a generally tulip like configuration as shown with the installed fastener 120a. When this occurs the gusset plate 118 and flange 114a are urged together and against the enlarged sleeve head portion 150a. The relative axial load is also being resisted by the engagement of the sleeve shoulder 145a against the inner surface of the flange 116a and the outer anvil 162 against the gusset plate 119. As with the embodiment of FIGS. 1 and 2, the open end of the enlarged head portion 150a is in direct engagement with the inside surface of the channel flange 114a. In this way the sleeve 146a substantially defines a columnar structure between the engaged end of head portion 150a and sleeve shoulder 145a to resist the relatively high installation loads and resultant, high load clamping the spaced flanges 114a, 116a together Upon a further increase in the relative axial force, a preselected magnitude is reached at which the force or pressure holding the movable inner swage anvil 166 is relieved or overcome permitting it to move axially relative to the outer anvil 162 whereby its swage cavity will radially overengage the reduced diameter portion 143, 143a of the sleeve 146, 146a. When this occurs the swage anvil 166 swages the reduced diameter portion 143a radially inwardly into the lock grooves 136a to firmly clamp the sleeve 146a and pin 126a together.

As can be seen from FIG. 3, the axial length of the smooth shank portion 152, 152a is selected such that an end section 131, 131a of the smooth shank portion 152, 152a adjacent to the lock grooves 136, 136a will extend past the outer end surface of the gusset plate 119 after the enlarged head portion 150a has been formed. Thus as the relative axial installation force increases the swage anvil 166 will move axially past the lock grooves 136a to partially radially overengage the smooth end section 131, 131a. When this occurs, however, without the presence of lockgrooves the available volume for material between the swage cavity of swage anvil 166 and the smooth end section 131, 131a will be reduced. This results in an excess volume of the material of the reduced diameter portion 143, 143a being present at this location. This excess material of the sleeve portion 143, 143a will then be deformed axially forwardly and radially outwardly while at the same time some column buckling can occur whereby an enlarged bulbed head 168a will be formed in engagement with the outer end surface of the gusset plate 119. In this manner the fastened joint will be firmly secured together. Upon a further increase in the relative axial force, the pin shank 130a is severed at the breakneck groove 138a removing the pintail portion 154, including the pull grooves 134. The installation tool 160 can now be further actuated to be removed from the swaged section of sleeve portion 143a with the severed pintail portion being ejected. The fastener 120 can be installed in the same manner as described for fastener 120a resulting in a completed installation of the joint between C-channels 110, 110a. As can be seen in FIG. 3, the length L2 of the straight land portion 148, 148a is slightly longer than the combined thickness t, ta of the gusset plate 118 and flanges 114, 114a. This permits the end of the sleeve head portion 150a to move radially inwardly during its final formation to a somewhat axially straighter configuration to provide a generally more direct line of axial engagement with the confronting inner surface of the flanges 114, 114a.

After final installation of the fasteners 120, 120a, the gusset plate 118 and channel flanges 114, 114a on the one side and the gusset plate 119 and spaced channel flanges 116, 116a on the other side are directly, tightly clamped together through the support sleeves 146, 146a at a desired magnitude such that slippage between the members is inhibited.

Installation of the fastener 120 can be further facilitated by use of retention tape (such as tape 57 of FIG. 2) and the use of an installation tool having the resilient, generally open gripping jaw structure previously described. It is believed that the pin 126, 126a and sleeve 146, 146a can be made of materials generally similar to that noted in the embodiment of FIGS. 1 and 2.

Figure 4:
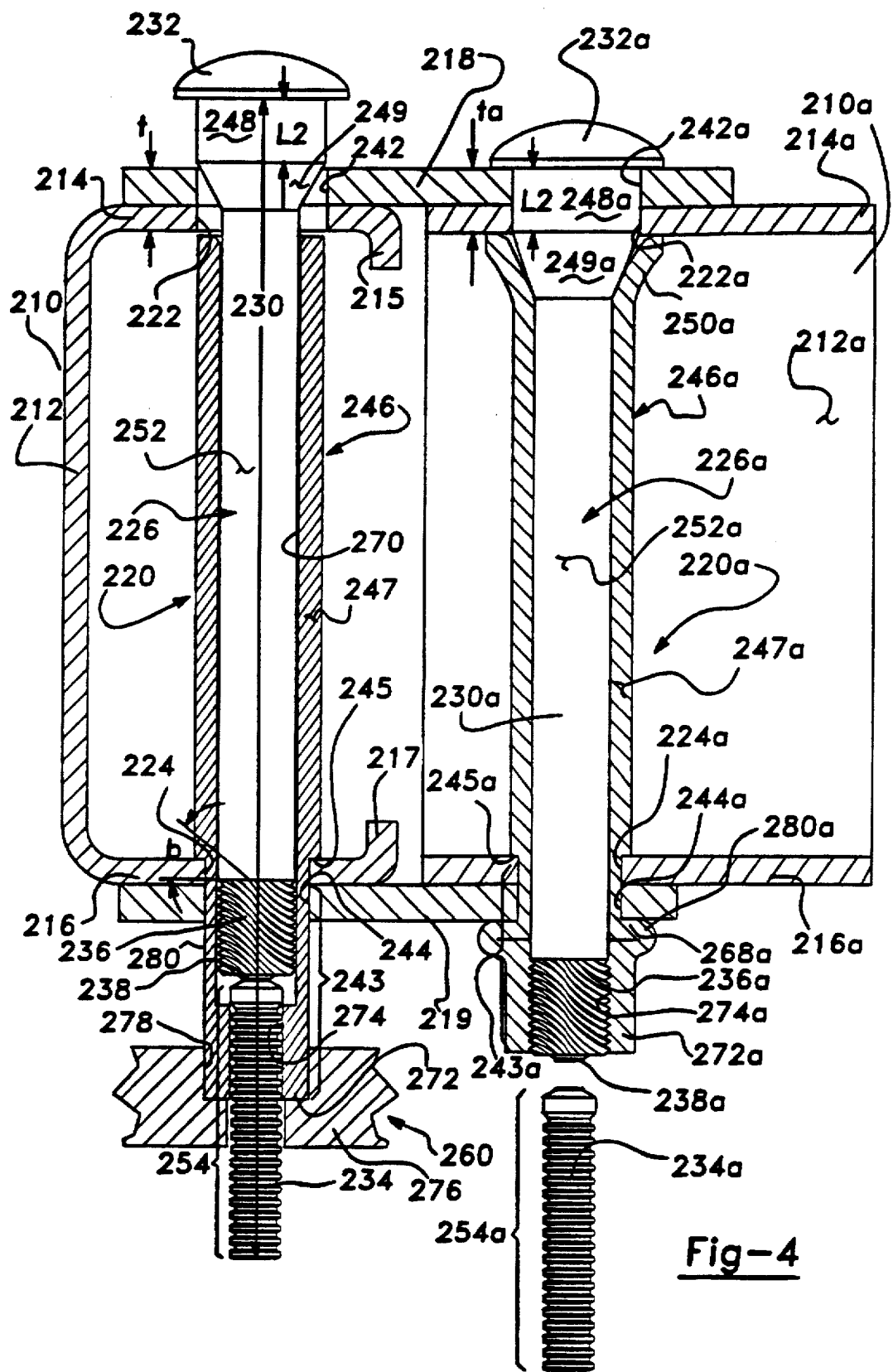
FIG. 4 is an elevational and partial sectional view similar to FIG. 3 depicting the use of a two-piece fastener utilizing a spiral or helical spline arrangement for connecting a pair of C-channel members.

A modified, two-piece threaded form of the fastener is shown in FIG. 4. In the description of the embodiment of FIG. 4 components are numbered beginning with 200 and components similar to like components in the embodiments of FIGS. 1, 2 and 3 are given the same or similar numeral designation but with the two hundred series of numbers. Unless described otherwise below the components of the embodiment of FIG. 4 can be considered to substantially conform to the description previously given for the similarly numbered components in the embodiments of FIGS. 1, 2 and 3 and, for purposes of brevity, such description may not be repeated. As will be seen the two-piece construction of FIG. 4, like that of FIG. 3, also eliminates the need for a separate collar, such as collar 28, and as such also further simplifies and facilitates handling.

In the embodiment of FIG. 4 the gusset plates 218, 219 are utilized to connect the C-channels 210 and 210a together by way of fasteners 220, 220a utilizing a connecting thread form. The fasteners 220 and 220a are identical except that fastener 220 is shown in its pre-installed condition while fastener 220a is shown in its installed condition. The fasteners 220, 220a while utilizing a threaded type construction are similar in operation to the pull type fasteners having a connecting thread feature as generally shown and described in U.S. Pat. No. 4,846,611, issued Jul. 11, 1989 to Sadri et al.

Like the embodiments of FIGS. 1–3, the equal diameter bores 222, 222a in flanges 214, 214a and of bores 242, 242a in gusset plate 218 are of a diameter larger than that of the opposite, aligned bores 224, 224a in flanges 216, 216a and equal counterpart bores 244, 244a in gusset plate 219.

Looking now to FIG. 4, the threaded fastener 220, 220a includes a pin 226, 226a and a support sleeve 246, 246a. The pin 226, 226a has an enlarged pin head 232, 232a and a pin shank 230, 230a. The pin shank 230, 230a has a uniform, enlarged diameter portion 248, 248a extending from the pin head 232, 232a to a tapered portion 249, 249a. In addition the pin shank 230, 230a has a smooth shank portion 252, 252a of uniform, reduced diameter extending from the tapered portion 249, 249a to a threaded, spline portion 236, 236a. The threaded splined portion 236, 236a is connected to a pintail portion 254, 254a via an annular breakneck groove 238, 238a. The pintail portion 254, 254a is of a reduced diameter relative to the remaining portion of the pin shank 230, 230a and includes a plurality of pull grooves 234, 234a. The breakneck groove 238, 238a is of a further reduced diameter and cross-sectional area and is designed to fracture at a predetermined combination of relative axial load and torque load at the conclusion of the installation cycle.

The support sleeve 246, 246a is provided with a reduced diameter extension portion 243, 243a. A shoulder 245, 245a is defined by the juncture between the reduced diameter portion 243, 243a and the main sleeve portion 247, 247a. The reduced diameter portion 243, 243a is of a diameter generally equal to the diameter of the flange bores 224, 224a and gusset bores 244, 244a. Thus, when the pin 226, 226a and support sleeve 246, 246a of the fastener 220, 220a are preassembled to the C-channels 210, 210a and the gusset plates 218, 219 in preparation for installation, the reduced diameter portion 243, 243a will extend through the smaller diameter flange bores 224, 224a and associated gusset bores 244, 244a with a slight clearance fit. As such the shoulder 245, 245a will then be in engagement with the inside surface of the spaced flange 216, 216a prior to installation. It can be seen that the sleeve 246, 246a provides no axial engagement or interference with either of the gusset plates 218 or 219 thus facilitating the handling of these members in preparation for installation.

Looking to the pre-installed fastener 220, the support sleeve 246 is of an internally stepped construction with a large diameter, main central bore 270 to accept the smooth shank portion 252 including the threaded spline portion 236 of pin 226 with a slight clearance fit. The support sleeve 246 terminates at the outer end of the reduced diameter portion 243 in a lock portion 272 having a reduced diameter internal bore 274 which is of a diameter to accept the reduced diameter pintail portion 254 with a slight clearance fit. Thus the bore 274 of lock portion 272 will define an interference with the threaded spline portion 236.

The clearance fits described above, however, could be modified as previously described to hold the components together in an assembled relationship prior to installation. Thus in order to additionally facilitate handling of the fastener 220, 220a, the support sleeve 246, 246a can be lightly crimped onto the smooth shank portion 252, 252a to hold the pin 226, 226a and sleeve 246, 246a together or alternatively the sleeve 246, 246a can be provided with a slight interference fit with the shank portion 252, 252a. In this way the pre-assembled combination of pin 226, 226a and sleeve 246, 246a can be readily assembled into the one gusset plate 218 and spaced flanges 214, 214a of C-channels 210, 210a.

The threaded spline portion 236 has ridges and grooves which are helically formed generally at a preselected angle "b" relative to a line normal to the axis of the pin 226, 226a. The angle "b" can be selected depending in part upon the relative hardnesses of the pin 226, 226a and sleeve 246, 246a with larger helix angles generally requiring lower installation loads with resultant lower pin retention and lower load capacity and smaller helix angles generally requiring higher installation loads with resultant greater pin retention and higher load capacity. It is believed that a helix angle "b" of around 60° would provide satisfactory installation performance and load capacity. The spline portion 236, 236a can be formed by a rolling die process on a reduced diameter end portion of the pin shank portion 252, 252a. The outer or crest diameter of the spline portion 236, 236a will be generally equal to the diameter of the adjacent smooth shank portion 252, 252a and will be greater than that of the pintail portion 254, 254a. The minor or root diameter of spline portion 236, 236a can be slightly less than the diameter of the bore 274, 274a of the lock portion 272, 272a.

The pin and sleeve hardness ratios and amount of interference between the bore 274, 274a of the lock portion 272, 272a and the outer or crest diameter of the spline portion 236, 236a can be selected whereby cutting of the sleeve material during setting and radial expansion of the lock portion 272, 272a is minimized such that the sleeve material flows into the spline grooves.

It is believed that suitable materials for the pin 226, 226a and sleeve 246, 246a of threaded type fastener 220, 220a can generally be similar to those noted for the embodiments of FIGS. 1–3.

The fastener 220, 220a is set by the application of a relative axial force between the pin 226, 226a and sleeve 246, 246a via a pull tool 260 (partially shown) which can be of a type generally known in the art and hence the details thereof have been generally omitted.

Since it is necessary that the pin 226, 226a and sleeve 246, 246a rotate relatively to each other under the influence of the helical spline portion 236, 236a during installation, the tool anvil 276 which engages the outer end of the lock portion 272, 272a of the sleeve 246, 246a is constructed to be freely rotatable relative to the gripping jaws which engage the pull grooves 234, 234a and apply a relative axial force between the pin 226, 226a and sleeve 246, 246a to pull the fastener 220, 220a into clamp up in the manner described below. The construction of the tool 260, however, forms no part of this invention.

The tool 260 has an anvil member 276 having an engaging end cavity 278 which is shaped ro receive and to generally conform to the outer surface of the outer end of the lock portion 272. Upon actuation of the tool 260, a relative axial force is applied between the pin 226 and sleeve 246. The axial force moves the tapered portion 249 into the confronting end of the sleeve 246. As this occurs an enlarged sleeve head portion 250a begins to be formed into a generally tulip like or flared configuration. Subsequently, during the formation of the enlarged head portion 250a and while the pin head 232a is still spaced from the gusset plate 218, the threaded spline portion 236a engages the surface of the bore 274a of the lock portion 272a and moves the material of the bore 274a radially into the grooves of the threaded spline portion 236a. Sleeve material is continuously displaced by the splines throughout the spline length travelled by the sleeve 246a, thus continuously increasing the degree of groove fill by the sleeve material. This produces an interlock between the pin 226a and sleeve 246a. Since the material of sleeve 246a is soft relative to that of the pin 226a, as described above, the excess material of sleeve 246a can move relatively freely through the spline grooves, filling the spline grooves. The sleeve will rotate in the direction of the spline grooves in reaction to the helix angle of the spline grooves and the sleeve material displaced by the splines will flow into the grooves.

After the pin head 232a engages the surface of the gusset plate 218 the axial movement of the pin 226a relative to the sleeve 246a will cease. At this point an intermediate section 280, 280a of the reduced diameter portion 243, 243a will be located between the lock portion 272, 272a and the gusset plate 219. The relative axial load, however, will continue to increase to thread the sleeve 246a further onto the threaded splined portion 236a. This will apply an increased column load on the intermediate section 280a. The intermediate section 280a will then buckle under the increased load to form a bulbed head 268a adjacent to the outer surface of the gusset plate 219. The reduced diameter portion 243, 243a can be selectively annealed at the intermediate section 280, 280a to promote column buckling at the desired location and magnitude of relative axial force.

In this manner the fastened joint will be firmly secured together. Upon a further increase in the relative axial force, the pin shank 230a will be severed at the breakneck groove 238a removing the pintail portion 254, 254a including the pull grooves 234, 234a. The installation tool 260 can now be removed from the sleeve portion 243a with the severed pintail portion 254 being ejected. The fastener 220 can be installed in the same manner as described for fastener 220a resulting in a completed installation of the joint between C-channels 210, 210a.

After final installation of the fastener 220, 220a, the gusset plate 218 and channel flanges 214, 214a on the one side and the gusset plate 219 and spaced channel flanges 216, 216a on the other side are tightly clamped together through the sleeves 246, 246a at a desired magnitude such that slippage between the members is inhibited. As can be seen the sleeve 246a substantially defines a columnar structure between the end of sleeve head portion 150a and sleeve shoulder 145a.

Figure 5:
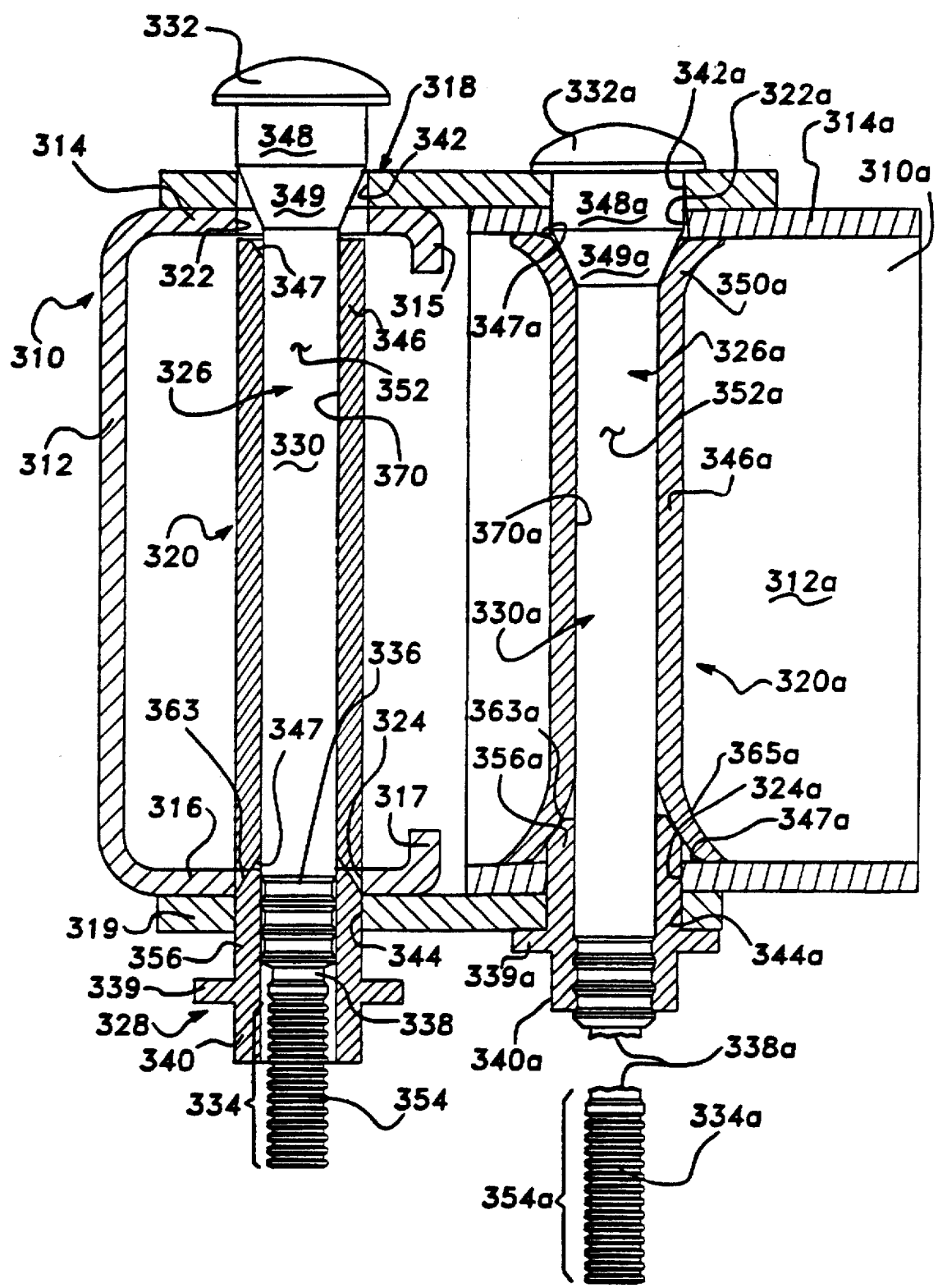
FIG. 5 is an elevational and partial sectional view similar to FIG. 2 depicting a modified form of three piece fastener for connecting a pair of C-channel members.

A modified three-piece form of fastener similar to that of FIGS. 1 and 2 is shown in FIG. 5. In the description of the embodiment of FIG. 5 components are numbered beginning with 300 and components similar to like components in the embodiment of FIGS. 1 and 2 are given the same or similar numeral designations with the addition of three hundred. Unless described otherwise below the components of the embodiment of FIG. 5 can be considered to substantially conform to the description previously given for the similarly numbered components in the embodiment of FIGS. 1 and 2 and, for purposes of brevity, such description may not be repeated.

In the embodiment of FIG. 5 the gusset plates 318, 319 are utilized to connect the C-channels 310 and 310a together by way of three-piece fasteners 320, 320a. The fasteners 320 and 320a are identical except that fastener 320 is shown in its pre-installed condition while fastener 320a is shown in its installed condition.

Looking now to FIG. 5, the pins 326, 326a can be identical to pins 26, 26a while support sleeves 346, 346a can be identical to support sleeves 46, 46a except for lead in chamfers 347, 347a at opposite ends of the through bore 370, 370a. The chamfers 347, 347a serve a purpose to be described.

The spaced flanges 314, 316 and 314a, 316a are provided with aligned openings or bores 322, 324 and 322a, 324a, respectively. The bores 322, 322a in flanges 314, 314a are of the same diameter as the opposite, aligned bores 324, 324a in flanges 316, 316a for a purpose to be described. In addition the gusset plate 318 has a plurality of bores 342, 342a which are generally of the same diameter as and adapted to be placed in coaxial alignment with the flange bores 322, 322a. Similarly, the gusset plate 319 has a plurality of bores 344, 344a which are generally of the same diameter as and adapted to be placed in coaxial alignment with the flange bores 324, 324a. Thus unlike the embodiments of FIGS. 1–4 the flange bores 322, 322a and 324, 324a are generally equal and are generally of the same diameter as gusset bores 342, 342a and 344, 344a. With this construction the gusset plates 318 and 319 can be of an identical construction and the flange bores 322, 322a, 324, 324a can be formed with the same drill, punch or other hole forming device.

At the same time, the tubular support sleeve 346, 346a is of generally uniform inside and outside diameters and is adapted to be received on the pin shank 330, 330a with a slight clearance fit. The support sleeve 346, 346a, in the uninstalled condition, has a generally uniform outside diameter whereby the sleeve 346, 346a can be moved through the gusset bores 342, 342a and associated flange bores 322, 322a with a slight clearance. In addition the opposite end of the support sleeve 346 prior to installation will be in an open relationship relative to the flange bores 324, 324a and aligned gusset bores 344, 344a. It can be seen that the sleeve 346, 346a provides no axial engagement or interference with either of the gusset plates 318 or 319 thus facilitating the handling of these members in preparation for installation.

As a matter of convenience to the operator and in order to facilitate handling of the fastener 320, the sleeve 346 can be provided with a slight interference fit with the lock grooves 336 or can be lightly crimped onto the smooth pin shank portion 352, 352a. In this way the pre-assembled combination of pin 326 and sleeve 346 can be handled as a single unit and readily assembled into the one gusset plate 318 and spaced flanges 314, 314a of C-channels 310, 310a.

In addition to the lead in chamfers 347, 347a on the support sleeve 346, 346a the fastener 320, 320a utilizes a cylindrical collar 328, 328a of a different construction from the collar 28, 28a of FIGS. 1 and 2. Thus the collar 328, 328a has a tubular swage shank portion 340, 340a extending forwardly from a flange 339, 339a and a rearwardly extending expander sleeve shank portion 356, 356a. The expander shank portion 356, 356a has a tapered outer surface 363, 363a at its end which generally matches the taper of the lead in chamfers 347, 347a of the support sleeve 346, 346a. Thus with the installation tool gripping the pull grooves 334, 334a of the pintail portion 354, 354a and the swage anvil engaging the end of the swage shank portion 340, 340a a relative axial force is applied between the pin 326, 326a and the support sleeve 346, 346a through the collar 328, 328a. As the relative axial force increases the tapered portion 349, 349a is drawn into the confronting end of the support sleeve 346, 346a to form an enlarged tulip head portion 350a at that end for engagement with the inner surface of the flange 314a. At the same time the expander shank portion 356, 356a is moved into the confronting end of the support sleeve 346, 346a to form a second enlarged tulip head portion 364a which then engages the inner surface of the flange 316a. As the relative axial force is increased the swage anvil overengages the swage shank portion 340, 340a swaging the material into locking engagement with the lock grooves 336, 336a. Upon a further increase in the relative axial force the pintail portion 354, 354a is severed at the breakneck groove 338, 338a completing the installation resulting in the installed fastener 320a. Again the final formation of the sleeve 346, 346a is substantially into a columnar shape to provide a desirable high level of support between the flanges 314, 314a and 316, 316a.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system for securing structural workpieces together at a predetermined magnitude of clamp load said system comprising at least one structural workpiece of a C-channel construction having first and second spaced apart channel flanges extending generally parallely from opposite ends of a center plate, said channel flanges having first and second aligned openings, respectively, in an area spaced from said center plate at which said flanges are generally not supported to fully accept the predetermined magnitude of clamp load, first and second connecting plate members for connecting said one structural workpiece to another structural workpiece, said first and second connecting plate members adapted to be located on the outer surfaces of said first and second flanges, respectively, and each having a plate opening adapted to be located in line with the associated one of said aligned openings through said flanges, a fastener including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the internal distance between said flanges, said support sleeve having an outer surface of a size to be moved through said plate opening of said first plate member and said first of said aligned openings of said first of said flanges in a generally clearance relationship, head forming means at said one end of said pin member for radially outwardly deforming said support sleeve at its end proximate to said one end of said pin member for forming an enlarged sleeve head for engaging the inner surface of said first of said flange members around said first of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of said second of said flanges around said second of said aligned openings, said enlarged sleeve head having a generally tulip configuration with the end surface at the proximate open end of said sleeve head engaging the inner surface of said first of said plate members with said support sleeve defining a substantially columnar structure between said end surface of said enlarged sleeve head and said bearing surface of said load bearing means for reacting the clamp load between said plate members, and securing means for securing said pin and said support sleeve together with said predetermined clamp load between said flanges and said plate members being reacted through said support sleeve with the inner surfaces of said first and second plate members and said pin head being substantially out of axial engagement with said support sleeve.

2. The fastening system of claim 1 with said pin shank extending through said aligned openings and said plate opening, said securing means comprising a lock groove structure on that portion of said pin shank located outside of said other of said flanges and a mating means operatively engageable with said lock groove structure for securing said pin and support sleeve together.

3. The fastening system of claim 1 with said other structural workpiece being of a C-channel construction similar to that of said one structural workpiece with said one and other of said structural workpieces adapted to be secured together through said first and second plate members with said flanges of said one structural workpiece being located proximate to and generally coplanar with said flanges of said other structural workpiece, the system further comprising a second fastener substantially the same as said first fastener, said first and second connecting plate members adapted to overengage the associated ones of said flanges of said one and other structural workpiece as located proximately to each other, said second fastener being operable with said other structural workpiece to secure said flanges of said other structural workpieces together with said plate members at said predetermined clamp load as applied between said flanges of said other structural workpiece and said plate members and being reacted through said support sleeve of said second fastener.

4. The fastening system of claim 1 with said pin shank having a generally straight portion of generally uniform enlarged diameter of a length at least around the combined thickness of said one of said flanges and said connecting plate member located proximate said pin head, a tapered portion proximate to said straight portion tapering generally from the enlarged diameter of said straight portion to a reduced diameter shank portion, said head forming means comprising said tapered portion with said tapered portion being axially movable into said support sleeve at its proximate end to form said enlarged sleeve head.

5. The fastening system of claim 4 with said enlarged diameter straight portion being of a diameter to be received in said first of said aligned openings and said first plate opening with a limited clearance.

6. The fastening system of claim 4 with said enlarged diameter smooth portion of said pin shank having a length greater than the combined thickness whereby said smooth shank portion is partially within said enlarged tulip head with said confronting end of said tulip head moving radially inwardly to define a more axially extending configuration.

7. The fastening system of claim 1 with said enlarged sleeve head having a generally tulip configuration with the end surface at the open, proximate end of said sleeve head engaging the inner surface of the one of the plate members with said support sleeve defining a substantially columnar structure between said end surface of said enlarged sleeve head and said bearing surface of said load bearing means for reacting the clamp load between said two plate members.

8. The fastening system of claim 1 with said preselected length of said support sleeve being generally equal to said distance between said flanges, said load bearing means being said end of said support sleeve opposite to said proximate end of said support sleeve.

said pin shank extending through said aligned openings and said plate opening, said securing means comprising a lock groove structure on that portion of said pin shank located outside of said other of said flanges and a mating means operatively engageable with said lock groove structure for securing said pin and support sleeve together.

9. The fastening system of claim 1 with said pin shank extending through said aligned openings and said plate opening, said securing means comprising a lock groove structure on that portion of said pin shank located outside of said other of said flanges and a mating means operatively engageable with said lock groove structure and being swaged into said lock groove structure for securing said pin and support sleeve together.

10. The fastening system of claim 1 with said preselected length of said support sleeve being greater than said distance between said flanges, said load bearing means on said support sleeve being located a distance from said proximate end of said support sleeve generally equal to said distance between said flanges, said support sleeve having a reduced diameter extension portion extending from said load bearing means through said second aligned opening of said second flange and through said plate opening in said second connecting member.

said securing means comprising a lock groove structure on that portion of said pin shank located outside of said other of said flanges and a mating means on said extension portion of said support sleeve and being operatively engageable with said lock groove structure for securing said pin and support sleeve together.

11. The fastening system of claim 10 with said extension portion being swaged into said lock groove structure for securing said pin and support sleeve together.

12. The fastening system of claim 11 with said pin shank having a smooth section located adjacent said lock groove structure, said extension portion overengaging said lock groove structure and said smooth section and forming a bulbed head proximate to said smooth section in response to the swaging of said extension portion into said lock groove structure and smooth section.

13. The fastening system of claim 10 with said lock groove structure comprising a spline having a helical thread form, said spline having crests and roots, said mating means on said extension portion being a section with a generally smooth reduced diameter bore of a diameter less than the diameter of said crests of said spline of said lock groove structure, said spline being moved into engagement with said bore of said section as said pin member is moved axially relative to said sleeve member to form said enlarged sleeve head, said spline forming mating threads in said bore of said section in response to said relative axial movement.

14. The fastening system of claim 13 with said extension portion having a second section of a reduced strength, said second section forming an enlarged bulbed head as said spline is threadably moved through said reduced diameter bore.

15. The fastening system of claim 13 with said pin shank having a breakneck groove adjacent said spline defining the weakest portion on said pin shank, a pull portion located on the end of said pin shank opposite said pin head and adapted to be gripped by a tool for applying a relative axial force between said pin and said sleeve to set the fastener, said spline of said pin being of a relatively hard material and said sleeve being of a relatively soft material, said crests and roots of said spline allowing a preselected cross-section and volume of sleeve material to flow into said spline into intimate contact with said spline whereby a frictional interlock is provided between said sleeve and said spline to secure said pin and sleeve together.

16. The fastening system of claim 15 with the diameter of said roots of said spline being generally equal to the diameter of said reduced diameter bore.

17. The fastening system of claim 1 with said load bearing means comprising a second enlarged sleeve head having a generally tulip configuration with the end surface of said second enlarged sleeve head being in load bearing engagement with the inner surface of said second flange around said second aligned opening.

18. The fastening system of claim 17 with said securing means comprising a collar member having a sleeve portion engageable with the end of said support sleeve opposite said proximate end and movable onto said opposite end for forming said second enlarged sleeve head.

19. The fastening system of claim 18 with said pin shank extending through said aligned openings and said plate opening, said securing means comprising a lock groove structure on that portion of said pin shank located outside of said other of said flanges and with said collar member having a second sleeve portion operatively engageable with said lock groove structure and being swaged into said lock groove structure for securing said pin and support sleeve together.

20. In a structural system including a plurality of structural workpieces to be secured together said system comprising at least one structural workpiece of a C-channel construction having a pair of spaced apart channel flanges extending generally parallely from opposite ends of a center plate, said channel flanges having aligned openings in an area spaced from said center plate at which said flanges are generally not supported to fully accept the predetermined magnitude of clamp load, a fastener like member including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the distance between said flanges, said support sleeve having an outer surface of a size to be moved through said one of said aligned openings of said one of said flanges in a generally clearance relationship, head forming means at said one end of said pin member for radially outwardly deforming said support sleeve at its end proximate to said one end of said pin member for forming an enlarged sleeve head for engaging the inner surface of said one of said flange members around said one of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of the other of said flanges around the other of said aligned openings, said enlarged sleeve head having a generally tulip configuration with the end surface at the proximate open end of said sleeve head engaging the inner surface of the one of the plate members with said support sleeve defining a substantially columnar structure between said end surface of said enlarged sleeve head and said load bearing surface of said load bearing means for reacting the clamp load between said two plate members, and securing means for securing said pin and support sleeve together with said predetermined clamp load between said flanges being reacted through said support sleeve.

21. In a fastening system for securing structural workpieces together at a predetermined magnitude of clamp load said system comprising at least one structural workpiece of a C-channel construction having first and second spaced apart channel flanges extending generally parallely from opposite ends of a center plate, said channel flanges having first and second aligned openings, respectively, in an area spaced from said center plate at which said flanges are generally not supported to fully accept the predetermined magnitude of clamp load, first and second connecting plate members for connecting said one structural workpiece to another structural workpiece, said first and second connecting plate members adapted to be located on the outer surfaces of said first and second flanges, respectively, and each having a plate opening adapted to be located in line with the associated one of said aligned openings through said flanges, a fastener including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the internal distance between said flanges, said support sleeve having an outer surface of a size to be moved through said plate opening of said first plate member and said first of said aligned openings of said first of said flanges in a generally clearance relationship, head forming means at said one end of said pin member for radially outwardly deforming said support sleeve at its end proximate to said one end of said pin member for forming an enlarged sleeve head for engaging the inner surface of said first of said flange members around said first of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of said second of said flanges around said second of said aligned openings, said enlarged sleeve head having a generally tulip configuration with the end surface at the proximate open end of said sleeve head engaging the inner surface of said first of said plate members with said support sleeve defining a substantially columnar structure between said end surface of said enlarged sleeve head and said bearing surface of said load bearing means for reacting the clamp load between said plate members, and securing means for securing said pin and said support sleeve together with said predetermined clamp load between said flanges and said plate members being reacted through said support sleeve with the inner surfaces of said first and second plate members and said pin head being substantially out of axial engagement with said support sleeve, said pin shank having a generally straight portion of generally uniform enlarged diameter of a length at least around the combined thickness of said one of said flanges and said connecting plate member located proximate said pin head, a tapered portion proximate to said straight portion tapering generally from the enlarged diameter of said straight portion to a reduced diameter shank portion, said head forming means comprising said tapered portion with said tapered portion being axially movable into said support sleeve at its proximate end to form said enlarged sleeve head, said enlarged diameter straight portion being of a diameter to be received in said first of said aligned openings and said first plate opening with a limited clearance, said enlarged sleeve head having a generally tulip configuration with the end surface at the open, proximate end of said sleeve head engaging the inner surface of the one of the plate members with said support sleeve defining a substantially columnar structure between said end surface of said enlarged sleeve head and said bearing surface of said load bearing means for reacting the clamp load between said two plate members, said preselected length of said support sleeve being generally equal to said distance between said flanges, said load bearing means being said end of said support sleeve opposite to said proximate end of said support sleeve, said pin shank extending through said aligned openings and said plate opening, said securing means comprising a lock groove structure on that portion of said pin shank located outside of said other of said flanges and a collar member operatively engageable with said lock groove structure and being swaged into said lock groove structure for securing said pin and support sleeve together.

22. In a fastening system for securing structural workpieces together at a predetermined magnitude of clamp load said system comprising at least one structural workpiece of a C-channel construction having first and second spaced apart channel flanges extending generally parallely from opposite ends of a center plate, said channel flanges having first and second aligned openings, respectively, in an area spaced from said center plate at which said flanges are generally not supported to fully accept the predetermined magnitude of clamp load, first and second connecting plate members for connecting said one structural workpiece to another structural workpiece, said first and second connecting plate members adapted to be located on the outer surfaces of said first and second flanges, respectively, and each having a plate opening adapted to be located in line with the associated one of said aligned openings through said flanges, a fastener including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the internal distance between said flanges, said support sleeve having an outer surface of a size to be moved through said plate opening of said first plate member and said first of said aligned openings of said first of said flanges in a generally clearance relationship.

head forming means at said one end of said pin member for radially outwardly deforming said support sleeve at its end proximate to said one end of said pin member for forming an enlarged sleeve head for engaging the inner surface of said first of said flange members around said first of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of said second of said flanges around said second of said aligned openings, said enlarged sleeve head having a generally tulip configuration with the end surface at the proximate open end of said sleeve head engaging the inner surface of said first of said plate members with said support sleeve defining a substantially columnar structure between said end surface of said enlarged sleeve head and said bearing surface of said load bearing means for reacting the clamp load between said plate members, and securing means for securing said pin and said support sleeve together with said predetermined clamp load between said flanges and said plate members being reacted through said support sleeve with the inner surfaces of said first and second plate members and said pin head being substantially out of axial engagement with said support sleeve, said pin shank having a generally straight portion of generally uniform enlarged diameter of a length at least around the combined thickness of said one of said flanges and said connecting plate member located proximate said pin head, a tapered portion proximate to said straight portion tapering generally from the enlarged diameter of said straight portion to a reduced diameter shank portion, said head forming means comprising said tapered portion with said tapered portion being axially movable into said support sleeve at its proximate end to form said enlarged sleeve head, said enlarged diameter straight portion being of a diameter to be received in said first of said aligned openings and said first plate opening with a limited clearance, said enlarged sleeve head having a generally tulip configuration with the end surface at the open, proximate end of said sleeve head engaging the inner surface of the one of the plate members with said support sleeve defining a substantially columnar structure between said end surface of said enlarged sleeve head and said bearing surface of said load bearing means for reacting the clamp load between said two plate members, said pin shank extending through said aligned openings and said plate opening, said preselected length of said support sleeve being greater than said distance between said flanges, said load bearing means on said support sleeve being located a distance from said proximate end of said support sleeve generally equal to said distance between said flanges, said support sleeve having a reduced diameter extension portion extending from said load bearing means through said second aligned opening of said second flange and through said plate opening in said second connecting member, said securing means comprising a lock groove structure on that portion of said pin shank located outside of said other of said flanges and a mating means on said extension portion of said support sleeve and being operatively engageable with said lock groove structure for securing said pin and support sleeve together, said extension portion being swaged into said lock groove structure for securing said pin and support sleeve together.

23. The fastening system of claim 22 with said pin shank having a smooth section located adjacent said lock groove structure, said extension portion overengaging said lock groove structure and said smooth section and forming a bulbed head proximate to said smooth section in response to the swaging of said extension portion into said lock groove structure and smooth section.

24. The fastening system of claim 23 with said enlarged diameter smooth portion of said pin shank having a length greater than the combined thickness whereby said smooth shank portion is partially within said enlarged tulip head with said confronting end of said tulip head moving radially inwardly to define a more axially extending configuration.

25. In a fastening system for securing structural workpieces together at a predetermined magnitude of clamp load said system comprising at least one structural workpiece of a C-channel construction having first and second spaced apart channel flanges extending generally parallely from opposite ends of a center plate, said channel flanges having first and second aligned openings, respectively, in an area spaced from said center plate at which said flanges are generally not supported to fully accept the predetermined magnitude of clamp load, first and second connecting plate members for connecting said one structural workpiece to another structural workpiece, said first and second connecting plate members adapted to be located on the outer surfaces of said first and second flanges, respectively, and each having a plate opening adapted to be located in line with the associated one of said aligned openings through said flanges, a fastener including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the internal distance between said flanges, said support sleeve having an outer surface of a size to be moved through said plate opening of said first plate member and said first of said aligned openings of said first of said flanges in a generally clearance relationship, head forming means at said one end of said pin member for radially outwardly deforming said support sleeve at its end proximate to said one end of said pin member for forming an enlarged sleeve head for engaging the inner surface of said first of said flange members around said first of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of said second of said flanges around said second of said aligned openings, said enlarged sleeve head having a generally tulip configuration with the end surface at the proximate open end of said sleeve head engaging the inner surface of said first of said plate members with said support sleeve defining a substantially columnar structure between said end surface of said enlarged sleeve head and said bearing surface of said load bearing means for reacting the clamp load between said plate members, and securing means for securing said pin and said support sleeve together with said predetermined clamp load between said flanges and said plate members being reacted through said support sleeve with the inner surfaces of said first and second plate members and said pin head being substantially out of axial engagement with said support sleeve, said pin shank having a generally straight portion of generally uniform enlarged diameter of a length at least around the combined thickness of said one of said flanges and said connecting plate member located proximate said pin head, a tapered portion proximate to said straight portion tapering generally from the enlarged diameter of said straight portion to a reduced diameter shank portion, said head forming means comprising said tapered portion with said tapered portion being axially movable into said support sleeve at its proximate end to form said enlarged sleeve head, said enlarged diameter straight portion being of a diameter to be received in said first of said aligned openings and said first plate opening with a limited clearance, said enlarged sleeve head having a generally tulip configuration with the end surface at the open, proximate end of said sleeve head engaging the inner surface of the one of the plate members with said support sleeve defining a substantially columnar structure between said end surface of said enlarged sleeve head and said bearing surface of said load bearing means for reacting the clamp load between said two plate members, said pin shank extending through said aligned openings and said plate opening, said preselected length of said support sleeve being greater than said distance between said flanges, said load bearing means on said support sleeve being located a distance from said proximate end of said support sleeve generally equal to said distance between said flanges, said support sleeve having a reduced diameter extension portion extending from said load bearing means through said second aligned opening of said second flange and through said plate opening in said second connecting member, said securing means comprising a lock groove structure on that portion of said pin shank located outside of said other of said flanges and a mating means on said extension portion of said support sleeve and being operatively engageable with said lock groove structure for securing said pin and support sleeve together, said lock groove structure comprising a spline having a helical thread form, said spline having crests and roots, said mating means on said extension portion being a section with a generally smooth reduced diameter bore of a diameter less than the diameter of said crests of said spline of said lock groove structure, said spline being moved into engagement with said bore of said section as said pin member is moved axially relative to said sleeve member to form said enlarged sleeve head, said spline forming mating threads in said bore of said section in response to said relative axial movement.

26. The fastening system of claim 25 with said extension portion having a second section of a reduced strength, said second section forming an enlarged bulbed head as said spline is threadably moved through said reduced diameter bore, said pin shank having a breakneck groove adjacent said spline defining the weakest portion on said pin shank, a pull portion located on the end of said pin shank opposite said pin head and adapted to be gripped by a tool for applying a relative axial force between said pin and said sleeve to set the fastener, said spline of said pin being of a relatively hard material and said sleeve being of a relatively soft material, said crests and roots of said spline allowing a preselected cross-section and volume of sleeve material to flow into said spline into intimate contact with said spline whereby a frictional interlock is provided between said sleeve and said spline to secure said pin and sleeve together, said pin shank having a smooth section located adjacent said lock groove structure, said extension portion overengaging said lock groove structure and said smooth section and forming a bulbed head proximate to said smooth section in response to the movement of said extension portion into said spline structure and said smooth section.

27. In a fastening system for securing structural workpieces together at a predetermined magnitude of clamp load said system comprising at least one structural workpiece of a C-channel construction having first and second spaced apart channel flanges extending generally parallely from opposite ends of a center plate, said channel flanges having first and second aligned openings, respectively, in an area spaced from said center plate at which said flanges are generally not supported to fully accept the predetermined magnitude of clamp load, first and second connecting plate members for connecting said one structural workpiece to another structural workpiece, said first and second connecting plate members adapted to be located on the outer surfaces of said first and second flanges, respectively, and each having a plate opening adapted to be located in line with the associated one of said aligned openings through said flanges, a fastener including a pin member and a support sleeve and adapted to be installed in response to a relative axial force applied between said pin member and said support sleeve, said pin member having an elongated shank with an enlarged pin head at one end, said support sleeve being of an elongated cylindrical construction adapted to be located on said pin shank and having a preselected length at least generally no less than the internal distance between said flanges, said support sleeve having an outer surface of a size to be moved through said plate opening of said first plate member and said first of said aligned openings of said first of said flanges in a generally clearance relationship, head forming means at said one end of said pin member for radially outwardly deforming said support sleeve at its end proximate to said one end of said pin member for forming an enlarged sleeve head for engaging the inner surface of said first of said flange members around said first of said aligned openings, said preselected length of said sleeve member locating said proximate end of said sleeve member substantially within the confines of the space between said flanges and substantially out of said one of said aligned openings prior to the formation of said enlarged sleeve head, said head forming means being axially movable relative to said support sleeve in response to a relative axial force applied between said pin member and said support sleeve for forming said enlarged sleeve head, load bearing means comprising a bearing surface on said support sleeve at a location generally spaced from its proximate end by said distance between said flanges for engaging the inner surface of said second of said flanges around said second of said aligned openings, said enlarged sleeve head having a generally tulip configuration with the end surface at the proximate open end of said sleeve head engaging the inner surface of said first of said plate members with said support sleeve defining a substantially columnar structure between said end surface of said enlarged sleeve head and said bearing surface of said load bearing means for reacting the clamp load between said plate members, securing means for securing said pin and said support sleeve together with said predetermined clamp load between said flanges and said plate members being reacted through said support sleeve with the inner surfaces of said first and second plate members and said pin head being substantially out of axial engagement with said support sleeve, said pin shank having a generally straight portion of generally uniform enlarged diameter of a length at least around the combined thickness of said one of said flanges and said connecting plate member located proximate said pin head, a tapered portion proximate to said straight portion tapering generally from the enlarged diameter of said straight portion to a reduced diameter shank portion, said head forming means comprising said tapered portion with said tapered portion being axially movable into said support sleeve at its proximate end to form said enlarged sleeve head, said enlarged diameter straight portion being of a diameter to be received in said first of said aligned openings and said first plate opening with a limited clearance, said enlarged sleeve head having a generally tulip configuration with the end surface at the open, proximate end of said sleeve head engaging the inner surface of the one of the plate members with said support sleeve defining a substantially columnar structure between said end surface of said enlarged sleeve head and said bearing surface of said load bearing means for reacting the clamp load between said two plate members, said preselected length of said support sleeve being generally equal to said distance between said flanges, said load bearing means being said end of said support sleeve opposite to said proximate end of said support sleeve, said pin shank extending through said aligned openings and said plate opening of said second connecting plate member, said securing means comprising a lock groove structure on that portion of said pin shank located outside of said other of said flanges and a mating means operatively engageable with said lock groove structure for securing said pin and support sleeve together, said load bearing means comprising a second enlarged sleeve head having a generally tulip configuration with the end surface of said second enlarged sleeve head being in load bearing engagement with the inner surface of said second flange around said second aligned opening, said securing means comprising a collar member having a sleeve portion engageable with the end of said support sleeve opposite said proximate end and movable onto said opposite end for forming said second enlarged sleeve head and with said mating means comprising a second sleeve portion on said collar member operatively engageable with said lock groove structure for securing said pin and support sleeve together.

* * * * *